US007496650B1

(12) United States Patent
Previdi et al.

(10) Patent No.: US 7,496,650 B1
(45) Date of Patent: Feb. 24, 2009

(54) IDENTIFYING AND SUPPRESSING TRANSIENT ROUTING UPDATES

(75) Inventors: Stefano Benedetto Previdi, Rome (IT); John Galen Scudder, Ann Arbor, MI (US); Clarence Filsfils, Brussels (BE); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 757 days.

(21) Appl. No.: 10/811,626

(22) Filed: Mar. 29, 2004

Related U.S. Application Data

(63) Continuation-in-part of application No. 10/340,371, filed on Jan. 9, 2003.

(51) Int. Cl.
G06F 15/173 (2006.01)
G01R 31/08 (2006.01)
H04L 12/28 (2006.01)

(52) U.S. Cl. ............... 709/223; 709/224; 370/229; 370/254

(58) Field of Classification Search .......... 370/16
See application file for complete search history.

(56) References Cited

U.S. PATENT DOCUMENTS

| 5,243,592 | A | | 9/1993 | Perlman et al. |
|---|---|---|---|---|
| 5,253,248 | A | * | 10/1993 | Dravida et al. ............ 370/228 |
| 5,999,286 | A | | 12/1999 | Venkatesan |
| 6,347,078 | B1 | | 2/2002 | Narvaez-Guarnieri et al. |
| 6,535,481 | B1 | | 3/2003 | Andersson et al. |
| 6,668,282 | B1 | | 12/2003 | Booth, III et al. |
| 2002/0093954 | A1 | | 7/2002 | Weil et al. |
| 2005/0078610 | A1 | | 4/2005 | Previdi et al. |
| 2005/0078656 | A1 | | 4/2005 | Bryant et al. |

FOREIGN PATENT DOCUMENTS

WO   WO 2005/039109   4/2005

OTHER PUBLICATIONS

U.S. Appl. No. 10/340,371, filed Jan. 9, 2003, Filsfils et al.

(Continued)

*Primary Examiner*—Tonia L Dollinger
*Assistant Examiner*—Anish Sikri
(74) *Attorney, Agent, or Firm*—The Law Office of Kirk D. Williams

(57) ABSTRACT

One or more sets of routing information are maintained. A network topology change indication of a progressive series of network changes is received, with at least one more associated network topology change indication of the progressive series of network changes expected to be received in the future. An updated set of routing information is computed based on the network topology change indication, and a determination is made as to whether or not the updated set of routing information changes nexthop information for one or more routes. In response to determining that the new set of routing information does not change nexthop information for said one or more routes and given the expectation of at least one more associated network topology change indication of the progressive series of network changes is expected to be received in the future, the routing information is not updated based on the updated set of routing information.

16 Claims, 11 Drawing Sheets

OTHER PUBLICATIONS

U.S. Appl. No. 10/346,051, filed Jan. 15, 2003, Bryant et al.
U.S. Appl. No. 10/442,589, filed May 20, 2003, Bryant et al.
U.S. Appl. No. 10/685,621, filed Oct. 14, 2003, Bryant et al.
U.S. Appl. No. 10/685,622, filed Oct. 14, 2003, Previdi et al.
U.S. Appl. No. 10/848,669, filed May 18, 2004, Filsfils et al.
"MPLS Traffic Engineering Fast Reroute—Link Protection," Release No. 12.0(10)ST, Cisco Systems, Inc., Jan. 16, 2003.
Demetrescu et al., "Oracles for Distances Avoiding a Link-Failure," Symposium on Discrete Algorithms, Proceedings of the Thirteenth Annual ACM-SIAM Symposium on Discrete Algorithms, pp. 838-843, 2002.
Mikkel Throup, "Fortifying OSPF/IS-IS Against Link Failure," AT&T Labs Research, Shannon Laboratory, Florham Park, NJ 07932, U.S.A., Sep. 2001.
Kai-Yeung Siu et al., "Fault-Tolerant Routing in the Internet Without Flooding," Kluwer Academic Publishers, Boston, 2000.
Zheng et al., "Shortest Path First With Emergency Exits," ACM 089791-405-8/90/0009/0166, pp. 166-176, 1990.
Srinivas Vutukury, "Multipath Routing Mechanisms for Traffic Engineering and Quality of Service in the Internet," Thesis for Doctor of Philosophy in Computer Science, University of California, Santa Cruz, Mar. 2001.
"Information technology—Telecommunications and information exchange between systems—Intermediate System to Intermediate System intra-domain routeing (sic) information exchange protocol for use in conjunction with the protocol for providing the connection-less-mode network service (ISO 8473)," ISO/IEC 10589, 2002.

* cited by examiner

US 7,496,650 B1

IDENTIFYING AND SUPPRESSING TRANSIENT ROUTING UPDATES

CROSS-REFERENCE TO RELATED APPLICATIONS

This is a continuation-in-part of U.S. application Ser. No. 10/340,371, filed Jan. 9, 2003, which is hereby incorporated by reference.

TECHNICAL FIELD

One embodiment of the invention relates to communications and computer systems; and more particularly, one embodiment especially relates to identifying and suppressing transient routing updates, such as, but not limited those generated in response to progressively adjusting route cost metrics used in conjunction with networked or otherwise connected routers, packet switching systems, computer systems, and other devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

In computer networks such as the Internet, packets of data are sent from a source to a destination via a network of links (communication paths such as telephone or optical lines) and nodes (usually routers directing the packet along one or more of a multiple links connected to it) according to one of various routing protocols.

De-activation of a network component (e.g., a link or a node) either by component failure or by planned downtime needs to be managed in order to avoid the risk of packet loss. In known systems, such de-activations cause routing transitions to take place, during which distributed routing algorithms may open up an alternative route. However, such transitions can be relatively very slow (e.g., several seconds) before convergence, and in the interim, data can be lost. Although packet loss is commonly dealt with by higher-level protocols that re-send packets, the inherent delays can adversely affect time critical functions such as voice and pseudo-wire traffic. Desired are new ways to efficiently reroute traffic to avoid failures in a network and to transition back to a desired network configuration once such failures have been fixed.

SUMMARY

Disclosed are, inter alia, methods, apparatus, data structures, computer-readable media, mechanisms, and means for identifying and suppressing transient routing updates, such as, but not limited those generated in response to progressively adjusting route cost metrics used in conjunction with networked or otherwise connected routers, packet switching systems, computer systems, and other devices.

One embodiment maintains one or more sets of routing information. A network topology change indication of a progressive series of network changes is received, with at least one more associated network topology change indication of the progressive series of network changes expected to be received in the future. An updated set of routing information is computed based on the network topology change indication, and a determination is made as to whether or not the updated set of routing information changes nexthop information for one or more routes. In response to determining that the new set of routing information does not change nexthop information for said one or more routes and given the expectation that at least one more associated network topology change indication of the progressive series of network changes is expected to be received in the future, the routing information is not updated based on the updated set of routing information. However, if the nexthop information changes or another associated network topology change indication of the progressive series of network changes is not expected to be received in the future, then the routing information is typically updated. Such progressive series of network changes may correspond to transitioning to a backup route, transitioning from a backup route, or transitioning in response to other network topology and/or configuration changes.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
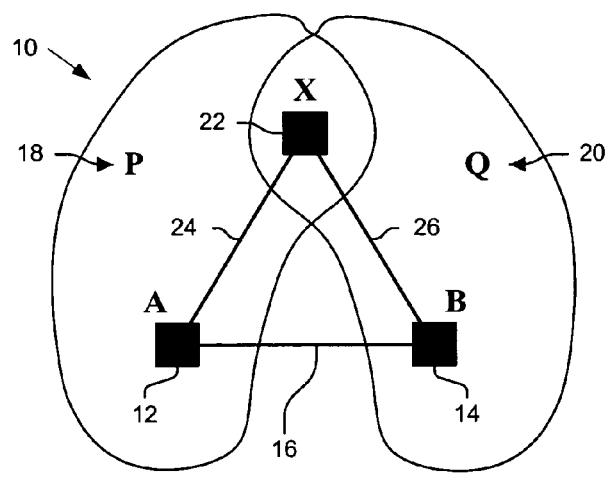
FIG. 1A is a network diagram illustrating the construction of a backup route in one embodiment.

Disclosed are, inter alia, methods, apparatus, data structures, computer-readable media, mechanisms, and means for identifying backup routes, distributing progressive metrics, and/or identifying and suppressing transient routing updates, such as, but not limited to those generated in response to progressively adjusting route cost metrics used in conjunction with networked or otherwise connected routers, packet switching systems, computer systems, and other devices.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic.

The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

One embodiment constructs a backup route in a data communications network. The backup route is calculated from a repairing node storing a network topology around an adjacent component which can be, for example, an adjacent link or an adjacent node joined by an adjacent link. In one embodiment, derived from the stored topology is a first set of nodes reachable from the repairing node without traversing the adjacent component. A second set of nodes from which a neighbor node of the adjacent component is reachable without traversing the adjacent component is derived. A backup route is then constructed around the adjacent component via one or more intermediate nodes in the intersection of the first and second sets.

One embodiment allows a backup route to be constructed such that, as long as a packet reaches the intermediate node, the packet will progress towards its destination using normal packet forwarding mechanisms and without traversing the link or node that has failed or otherwise been deactivated.

One mechanism for constructing backup routes is described in Miles et al., "Method and Apparatus for Constructing a Backup Route in a Data Communications Network," U.S. patent application Ser. No. 10/340,371, filed Jan. 9, 2003, which is hereby incorporated by reference.

FIG. 1A is a network diagram illustrating the construction of a backup route in one embodiment. As shown, network 10 represents a communication network of nodes 12, 14, 22 and links 16, 24, 26, which can be the Internet or a sub-network such as a routing domain or a virtual network which is designated generally as network 10. Repairing node A 12 is connected to node B 14 via link 16.

Node A 12 computes a first set 18 of nodes (i.e., "P-space" 18) of all nodes reachable according to one or more routing protocols from node A 12 other than nodes reachable by traversing link 16. Node A 12 then computes a second set of nodes including the set of all nodes from which node B 14 is reachable without traversing the link 16 and represented as "Q-space" 20. In one embodiment, P-space 18 and Q-space 20 are pre-computed. One embodiment then determines whether any intermediate nodes exist in the intersection between P-space 18 and Q-space 20, and if so, the identity of the node(s). Shown in the example is one such intermediate node, node X 22. Thus, in the event of the failure of link 16, packets of data can be sent from node A via a link 24 to intermediate node X 22, and then via link 26 to target node B 14. Links 24 and 26 can be viewed together as a "virtual" link forming a repair path in the event that link 16 fails or an alternative route is otherwise required.

Of course, the labels "P-space" and "Q-space" are arbitrary and used for convenience, and other embodiments may use any other label for the respective sets of nodes.

Figure 1B:
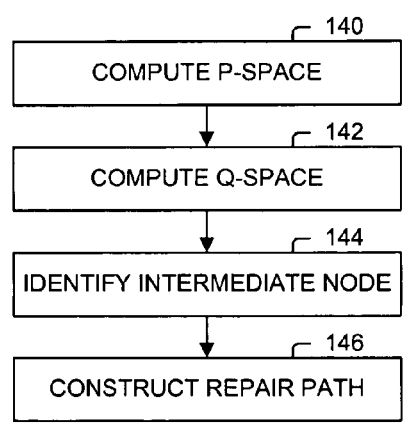
FIG. 1B is a flow diagram illustrating a high-level view of the construction of a backup route in one embodiment.

FIG. 1B is a flow diagram illustrating a high level view of a process of constructing a backup route used in one embodiment. In process block 140, a P-space is computed. In process block 142, a Q-space is computed. In process block 144, an intermediate node in the intersection between P-space and Q-space is identified; and in process block 146, a repair path is constructed. As a result of such operations, for example, the path AXB shown in FIG. 1A can be constructed.

Because the P-space and the Q-space are derived based on the inherent routing protocol(s), one embodiment requires no additional routing protocol to route traffic. In one embodiment, routing in network 10 is governed by a link state protocol, the nature of which is discussed generally hereinafter. One embodiment can use any appropriate protocol, which, like the link state protocol, ensures that all nodes have the requisite relevant data in order to derive a set of reachable nodes for one or more nodes in the network. In one embodiment, all nodes pre-compute backup routes for all adjacent network components (e.g., nodes, links, etc.), and therefore, as soon as a node detects de-activation of an adjacent component or otherwise needs an alternative route, that route is immediately available. As a result, packet loss is typically reduced. Because the link state protocol is effectively undisturbed in one embodiment, the fact that a repair path has been used is transparent to the remainder of the network. In the example discussed, backup routes are computed around an adjacent node, for example by constructing a Q-space for each neighbor node (as target node) of the adjacent node in process block 142.

When appropriate, one embodiment avoids packets being sent from node A 12 to intermediate node X 22 from looping back to node A 12 over link 24 by tunneling the packet to node X 22. In that case the intermediate node X 22 includes the tunnel end point.

In a further optimization, in one embodiment, the P-space is extended in process block 140 to include additional nodes within one hop of the nodes in the P-space. Thus, the packet can be tunneled to the adjacent node in normal P-space with the instruction that the packet should be forwarded to the additional node, for example using "directed forwarding". In a further optimization, in one embodiment, the P-space is extended in process block 140 by including in it all neighboring nodes reachable without traversing the identified possible failing link.

One embodiment identifies one or more backup routes for a node based on information received via any appropriate routing protocol whereby the node has sufficient information to predict the forwarding behavior of other nodes in a stable network. Generally, link state protocols such as Intermediate System to Intermediate System (IS-IS) or Open Shortest Path First (OSPF) are appropriate protocols. Link state protocols of this type will be well understood by the skilled reader.

In general, a link state protocol relies on a routing algorithm resident at each node. Each node on the network advertises throughout the network links to neighboring nodes and provides a cost associated with each link which can be based on any appropriate metric, such as a link bandwidth or delay and is typically expressed as an integer value. A link may have an asymmetric cost, that is, the cost in the direction AB along a link may be different from the cost in a direction BA. Based on the advertised information in the form of a link state packet (LSP), each node constructs a link state database (LSDB) which is a map of the entire network topology, and from that, constructs generally a single optimum route to each available node based on an appropriate algorithm such as, for example a shortest path first (SPF) algorithm. As a result a "spanning tree" is constructed, rooted at the node and showing an optimum path including intermediate nodes to each available destination node. Because each node has a common LSDB (other than during transient times during when advertised changes are propagating around the network), any node is able to compute the spanning tree rooted at any other node as well as the "reverse spanning tree", sometimes termed a "sink tree" showing the optimum route for each node from which the node is reachable.

As a result, when a packet for a destination node arrives at a node (which for convenience is termed here as the "first node"), the first node identifies the optimum route to the destination and forwards the packet to the next node along that route. The next node repeats this operation, and so on, until the packet is received by the ultimate destination.

Using one known link state protocol, each node decides, irrespective of the node from which it received a packet, the next node to which the packet should be forwarded. In some situations, this can give rise to a "loop". In particular, a loop can occur when the databases (and corresponding forwarding information) are temporarily de-synchronized during a routing transition, such as when because of a change on the network, a new LSP is propagated throughout the network. As an example, if node A sends a packet to node Z via node B, that being the optimum route according to A's SPF, a situation can arise where node B, according to its SPF determines that the best route to node Z is via node A and sends the packet back. This can continue indefinitely, although usually the packet will have a maximum hop count after which it is to be discarded. Such a loop can be a direct loop between two nodes or an indirect loop around a circuit of nodes.

In some circumstances, it is desirable to have more control over the route that a packet takes, and in which case, "tunneling" can be used. According to this scheme, if a node A receives a packet destined for node Z and for some reason it is desired that the packet should travel via node Y, under normal circumstances, node A would have no control over this (unless Y was an adjacent node), as the route is dependent on the SPF at node A and any intermediate nodes as well. However, node A can "tunnel" the packet to node Y by encapsulating the received packet within a packet having destination node Y and sending it to node Y which acts as the tunnel end point. When the packet is received at node Y, it is decapsulated and Y then forwards the original packet to node Z according to its standard SPF. An alternative approach is to use IP source routing, in which the packet is converted to a loose source route packet replacing the destination with the next-hop, and then specifying the intermediate nodes and real destination. The route can be further controlled, under appropriate protocols, by using multiple tunnels whereby a packet destined for a first node is encapsulated in a packet destined for a second node which in turn is encapsulated in a packet for a third node and so forth. However, this is typically a less attractive option as the maximum payload decreases with each encapsulation and multiple encapsulations are less easily built in the forwarding hardware at high speed. A further alternative is to use directed forwarding, whereby the encapsulating packet includes a specific instruction as to which neighboring node of the end point the encapsulated packet should be sent, which includes the "release point".

The manner in which a backup route is constructed by one embodiment in a link state protocol system is further explained with regard to the following examples.

Figure 2A:
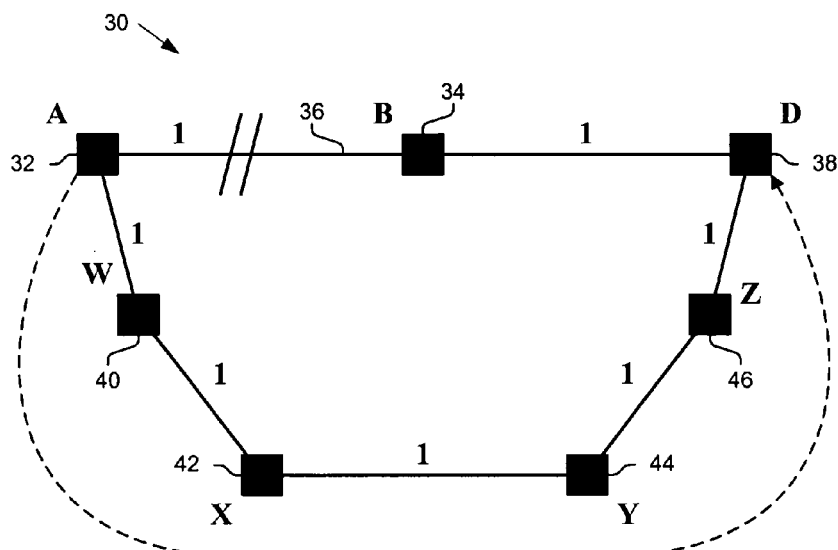
FIG. 2A is a network diagram illustrating considerations relevant to constructing a backup route in one embodiment.

Referring firstly to FIG. 2A, shown is a network diagram illustrating considerations relevant to constructing a backup route in an illustrative network 30, which includes repairing node A 32, adjacent node B 34, and link 36 between them. Node B 34 has one further neighboring node D 38. An alternative route from node A 32 to node D 38 is via nodes W 40, X 42, Y 44, and Z 46. The link cost associated to each link in network 30 illustrated in FIG. 2A is a cost of one.

If link 36 or node B 34 fails, then node A 32 must send packets to node D 38 via nodes W 40, X 42, Y 44, and Z 46. However, if the packet is sent under normal circumstances to node W 40, then node W 40 will, not knowing that the link 36 has failed, compute that the lowest cost route to node D 38 is back via node A 32 (i.e., three intermediate links—thus a cost of three versus a cost of four via X 42, Y 44, Z 46, D 38). However, if node A is able to "force" the packet as far as node X 42, then node X 42 will see the repair path as the cheaper route as opposed to sending back via node A 32. As a result, one embodiment tunnels the packet from node A 32 to node X 42 (or alternatively either of nodes Y 44 or Z 46, which are also appropriate tunneling end points for this backup route). However, it would not be appropriate to tunnel the packet directly from node A 32 to node D 38, because when the packet is intercepted at node W 40, it would identify the cheaper route to node D 38 as in fact going once again via nodes A 32 and B 34.

Figure 2B:
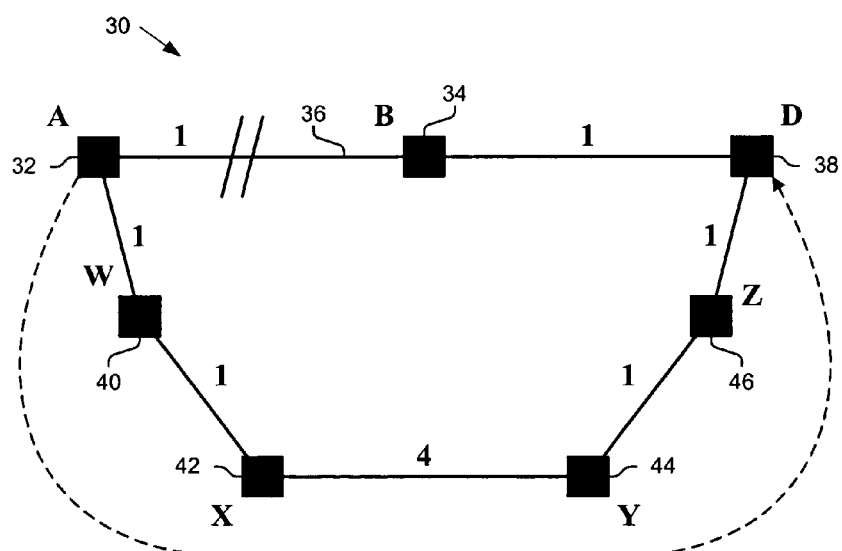
FIG. 2B is a network diagram illustrating considerations relevant to constructing a backup route in one embodiment.

The problem becomes more complex in the situation shown in FIG. 2B (which is a variant network diagram to that of FIG. 2A), in which the cost of link between nodes X 42 and Y 44 is increased to four. In this example, there is no viable tunneling end point as can be seen from a consideration of the costs at each node. To overcome this, however, directed forwarding can be employed, selecting node X 42 as the tunnel endpoint and then forwarding the packet to node Y 44 as the release point from which node D 38 can be reached using normal forwarding. Node W 40 represents a special case. If node W 40 receives a packet with destination as node Y 44 (for example as a tunnel end point), then the costs of route X 42, Y 44, and route A 32, B 34, D 38, Z 46, Y 44 are equal, termed an "equal cost path split". As a result, there is a risk that some packets may flow back towards the failed link and it cannot be considered an appropriate end point.

Employing this process, one embodiment efficiently determines the repair path required and automatically determines any endpoint or release point required. The application of a process employed in one embodiment is shown in the following example.

Figure 3:
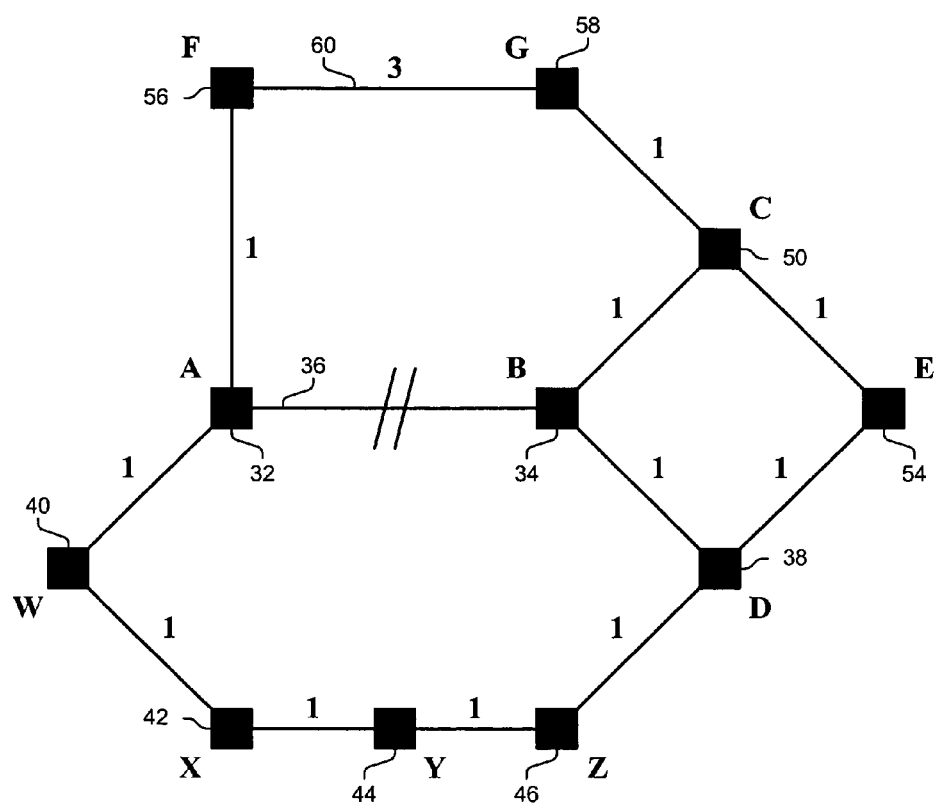
FIG. 3 is a network diagram illustrating the construction of a backup route in one embodiment.

FIG. 3 is a network diagram including an extension of the network diagram of FIG. 2A. The example topology of FIG. 3 includes the network shown in FIG. 2A with additional nodes C 50, E 54, F 56, and G 58, respectively forming additional circuits AFGCBA and BCEDB. All links have a cost of one except link 60 between nodes F 56 and G 58 which has a cost of three.

Figure 4:
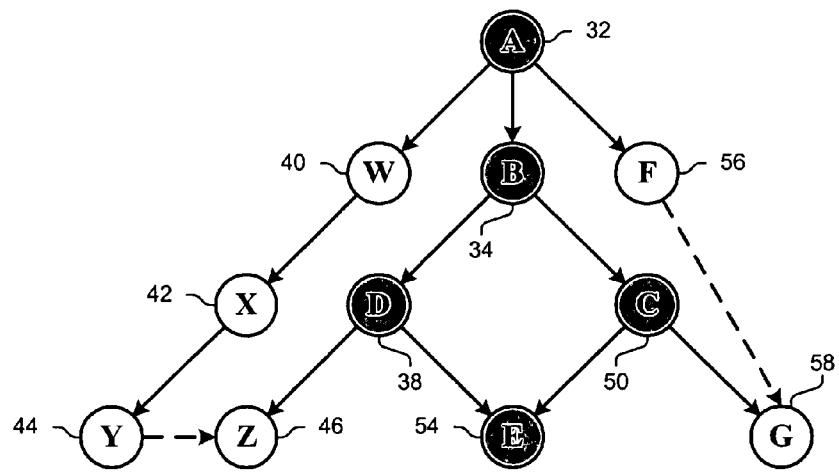
FIG. 4 is a block diagram illustrating the spanning tree for a node of one embodiment.

FIG. 4 is a spanning tree diagram for a node in the network shown in FIG. 3. In order to construct a backup route in one embodiment, a spanning tree is computed rooted at node (e.g., router) A 32. Those nodes reachable by the failed link 36 between nodes A 32 and B 34, which are shown in shaded gray including nodes that, because of an equal cost path split, could be reached by traversing the failed link 36. The shaded nodes are easily identified by running an SPF algorithm and setting a flag in the data structure when the failed component is explored and propagating that flag to all nodes reached over that component. In the present example, in order to accommodate directed forwarding, the spanning tree, representing P-space 18 in FIG. 1, is extended to include as reachable nodes any nodes that are one hop away from a node already in the set, as a result of which node G 58 and node Z 46 are included in P-space.

One embodiment then computes the Q-space. This computation is dependent on whether a potential node failure or a potential link failure is being considered. If it is a potential link failure, then it is enough to ensure that a repair path is constructed around the link to the node the other side of it (e.g., node B 34 as target node) after which traffic could be expected to be forwarded normally. However, if node B 34 failed, then typically a repair path to each neighbor of the failed node (other than the node A 32 itself of course) is constructed on the basis that the failed node would have forwarded traffic to its neighboring nodes in any event, and the neighboring nodes would then normally forward packets irrespective of how the packet reached them. It will be seen the worst case scenario is typically a node failure rather than link failure.

Figure 5:
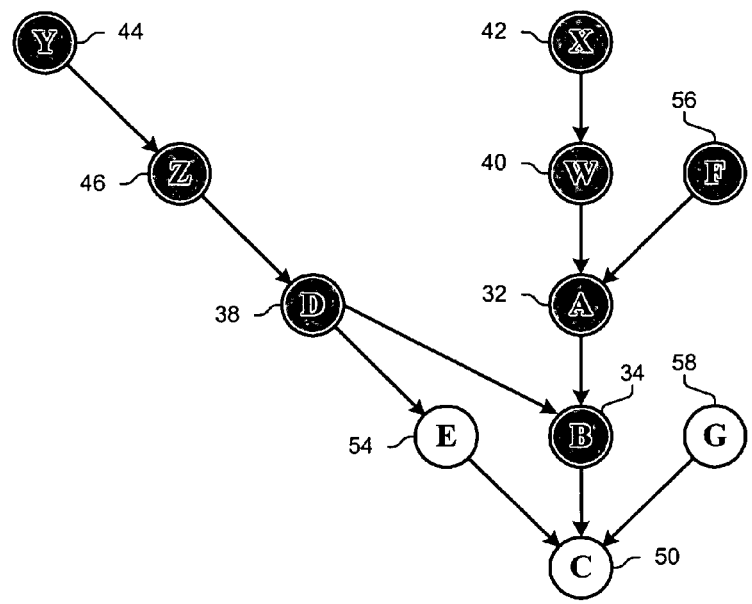
FIG. 5 is a block diagram illustrating the reverse spanning tree for a node of one embodiment.
Figure 6:
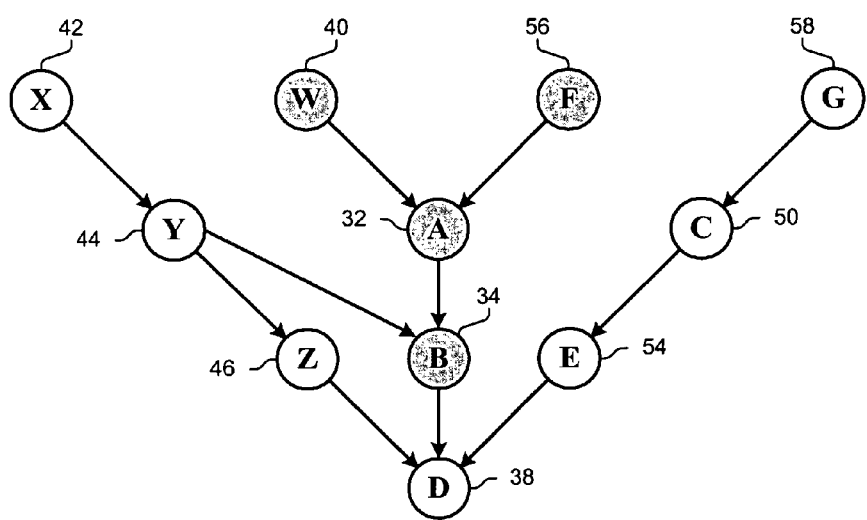
FIG. 6 is a block diagram illustrating a reverse spanning tree for a node of one embodiment.

FIG. 5 and FIG. 6 are reverse spanning tree diagrams computed for the two neighbors to node B 34, nodes C 50 and D 38 respectively. In each case, those nodes reachable only via the failed link (or on an equal cost path split) are shaded gray such that the "Q-space" includes the unshaded nodes.

The first set of nodes (P-space) reachable from node A 32 as shown in FIG. 4 includes the set {FGWXYZ}. The Q-space from node C 50 is {CEG} as can be seen in FIG. 5 and the Q-space for node D 38 is {DEXYZ} as can be seen from FIG. 6. It will be appreciated that instead of extending the P-space to include additional nodes one hop away, Q-space can be extended instead in conjunction with directed forwarding. In addition it would be possible to run the SPF algorithm to obtain P and Q-space in any order.

As a result the respective release points from A 32 to each of B's 34 neighbor nodes can be obtained from the intersection of the respective P-space and Q-space sets as follows: release points from A 32 to D 38: {XYZ}, where X 42 and Y 44 are coincident tunnel endpoints and release points whereas Z 46 must be reached by directed forwarding from the tunnel endpoint Y 44; and release points from A 32 to C 50: {G}, where G 58 is reached via directed forwarding from a tunnel end point F 56.

Figure 7:
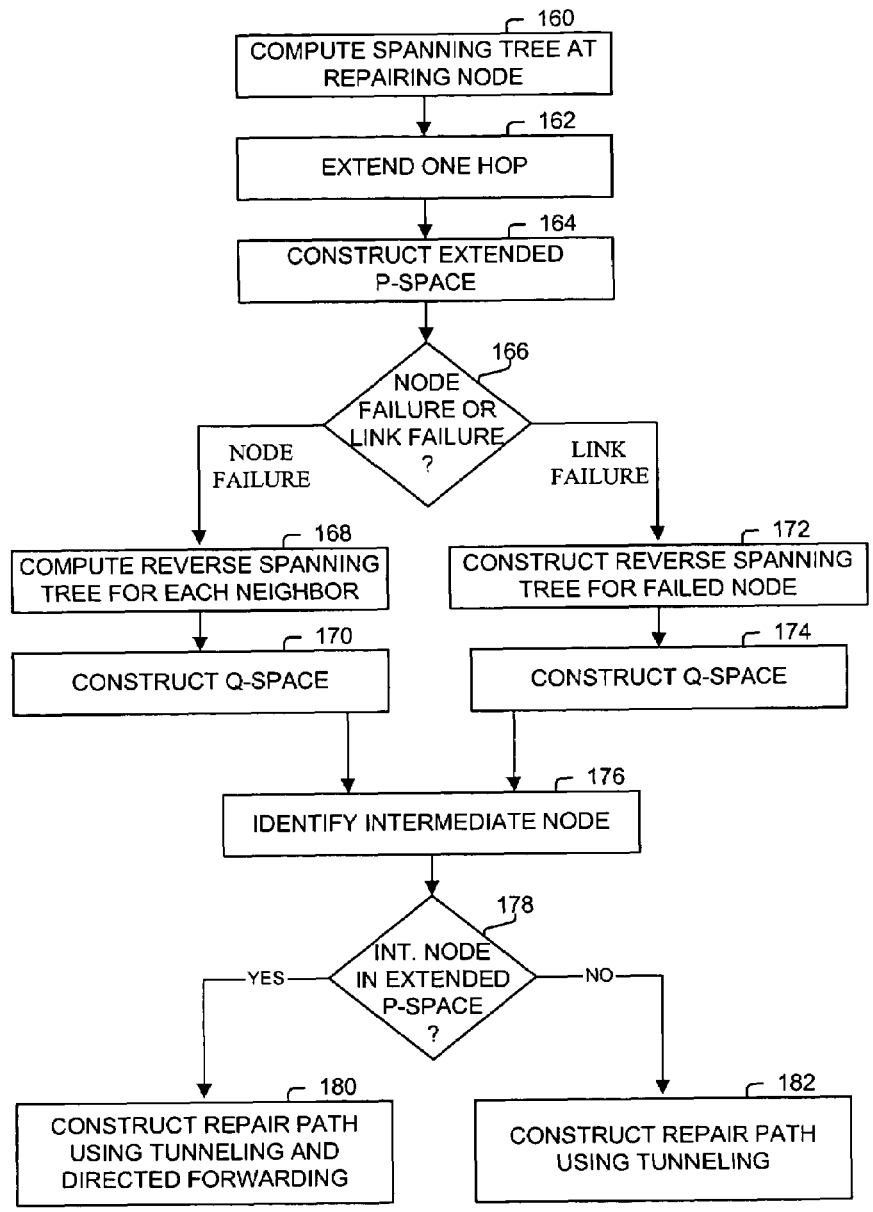
FIG. 7 is a flow diagram illustrating the construction of a backup route in one embodiment.

FIG. 7 is a flow diagram illustrating a process used in one embodiment for constructing a backup route. In process block 160, the spanning tree at the repairing node is computed excluding nodes reached by traversing the adjacent component. In the optimization discussed above, the set of nodes obtained is extended by one hop in process block 162 and an extended P-space is constructed in process block 164. The backup route constructed is then dependent upon whether node failure or link failure is addressed as represented by optional process block 166. If node failure is addressed, then in process block 168, the reverse spanning tree is computed for each neighbor of the failed node excluding nodes from which the neighbor is reachable via the repairing node and adjacent link. In process block 170, the Q-space is constructed. If at process block 166, link failure is addressed, then at process block 172 the reverse spanning tree is computed for the failed adjacent node excluding nodes from which the adjacent node is reachable via the repairing node and adjacent link. In process block 174, once again, a Q-space is constructed.

Whichever failure type is addressed at process block 166, at process block 176 the intermediate node is identified. In process block 178 it is then assessed whether the intermediate node is in the extended P-space. If it is then at process block 180 the repair path is constructed using tunneling and directed forwarding to the intermediate node. If the intermediate node is not in extended P-space then the repair path is constructed at process block 182 using tunneling to the intermediate node as discussed above.

For example, in the context of a previous example, in process block 164, the P-space for node A can be extended very simply by calculating the P-space for the neighbors to node A, namely nodes F and W which again can be calculated at node A from its LSDB. Because A will inevitably forward packets to one of these neighbors in the event that link 36 or node B fails, the set of reachable nodes and thus potentially, release points can be simply extended in this manner. It can be shown that the P-space can be derived individually for each neighboring node or by running an SPF algorithm rooted at A but decreasing the cost of nodes reachable over the neighboring node by an amount including the cost of the direct link between the nodes less the sum of the shortest cost link in each direction (bearing in mind that the direct link may not be the lowest cost link, and that there may be asymmetry). As a result individual SPFs rooted at each node do not need to be run.

As indicated, the preceding discussion is based on a worst case scenario that a node fails but it will be appreciated that it is possible to apply the process to an environment where link-failure is compensated in process block 166 and subsequent process blocks 172 and 174. In that case, referring once again to FIG. 3 the adjacent component that fails is link 36 and it is assumed that node B 34 has not failed or otherwise been de-activated. For such a repair mechanism to operate it is necessary to detect that the neighboring node is still operational. However if this mechanism is adopted, then it is simply necessary to calculate a repair path from repairing node A 32 with target node B 34 rather than from node A 32 with the neighbors of node B 34 as target nodes. This can be adopted for each link neighboring node A 32.

A link failure repair strategy can be adopted where it is established that, using a node failure repair strategy, it would not have been possible to identify a repair path to certain target nodes. This is effective when the presumed failed node constitutes a single point of failure such that the target nodes are unreachable other than via the presumed failed node. In that case by forwarding packets to the "failed" node this is their only prospect of arriving at the "unreachable" nodes.

However this approach can give rise to problems in some instances and a further optimization is discussed here to mitigate such problems. In particular problems can arise if a link repair strategy is adopted but certain target nodes are unreachable for other reasons than a single point of failure. This alternative reason may be that severe link cost asymmetries prevent a repair path from being available adopting the process discussed above or that there is interference caused by a repairing node including another neighbor of the failed node in its repair path in some circumstances.

Accordingly, if it is established that a repair path is not available for some neighbors of the failed node (referred to as the set of unavailable nodes {X}) a check is performed to establish why. An SPF is run rooted at A and with B removed. If all members of {X} are unreachable then B is a single point of failure and a link repair strategy can be run for packets to those nodes, as the worst case scenario is that the node really has failed in which case the members of {X} remain unreachable even after convergence.

However if any member of {X} is reachable then a repair path must be unavailable because of asymmetry or interference. In that case if a link failure repair strategy is adopted and the node has in fact failed then the strategy is worse as traffic to some otherwise reachable destinations would be forwarded along a link repair path that may not work. Here, therefore all repairs for the component are abandoned.

Accordingly the repairing node can determine whether a link failure repair strategy should be adopted.

Although it would be possible to calculate repair paths on-the-fly, in the embodiment discussed here repair paths are pre-computed in order that they can be implemented promptly upon failure detection. As a result each node contains the pre-computed repair paths for the failure of each adjacent component—in the example discussed, for each adjacent node (but not destination nodes beyond that as it is enough to route the packet around the failure after which normal forwarding will take over). When the failure of an adjacent component is detected by the node the appropriate repair path or paths are put in place. Where necessary an incoming packet is then directed along the appropriate route. Each of these steps will now be discussed in more detail.

As discussed above, repair paths are identified by examining the intersection of a P-space and a Q-space at process block 178 in FIG. 7 and using tunneling/directed forwarding as appropriate. However more than one repair path may be available, and in some cases a repair path may not in fact be needed. As represented in process block 184, optionally, the first computation step, therefore, is to limit the construction of repair paths to instances where this is necessary. As a result, any neighbor nodes to the adjacent node that are already reached by a shortest path route not traversing the adjacent node do not need to have a repair path calculated for them. Put conversely, it is only necessary to construct repair paths for neighbors which, according to the repairing node's spanning tree, are reached via the path for which protection is to be performed. In addition, if the destination node lies on an equal cost path split then the other limb can be adopted as the repair path. As a result the computational burden on the repairing node is reduced.

For each neighbor that still requires a repair path, the possible paths are derived as discussed above. If a complete set of repair paths is not possible around a given adjacent component then none are constructed as, if an incomplete set of repair paths were constructed, packets could be lost. In cases where the tunnel endpoint is a neighbor of the repairing node then normal forwarding to the endpoint can be adopted unless directed forwarding is required from the tunnel endpoint to the release point (in which case the tunneling mechanism is required).

If multiple repair paths are available (i.e. more than one pair of tunnel endpoint and release point is identified in the intersection of P-space and Q-space) then the optimum repair path is selected on a least cost basis, based on the cost to the release point (or tunnel endpoint if these are coincident). In the present example, the cost is the cost of the path that packets will actually traverse via the release point including the cost of a new link over which directed forwarding is performed as this represents a lower computational burden and may be more representative than, say, the cost to the target via the repair path. However the selection process can be optimized by stopping running the Q-space reverse SPF as soon as a node in the (extended) P-space is identified. Although this may not find the shortest route this is outweighed by the reduced computational burden. A yet further optimization is to ensure that no downstream path (i.e. intermediate nodes including a neighbor of the repairing node) is excluded. This is achieved by stopping running the reverse SPF algorithm at the earlier of: (a) having reached all neighbors of the repairing node via the failed link (in which case there can be no downstream path as these neighbors will thus not occur in Q-space) and having identified another release point; and (b) having reached a neighbor of the repairing node not via the failed link. Of course any appropriate manner of identifying the optimum repair path can be adopted.

Once the least cost repair path is assigned, there may still be multiple repair paths, one for each neighbor of the adjacent component which is a repair path target. To identify which repair path should be used it is necessary to assess the final destination of an incoming packet to the repairing node. This is achieved by recording which neighbor node of the adjacent component would be used to reach each destination via the adjacent component in normal operation and assigning the traffic to the repair path generated with the appropriate neighbor as target.

Figure 8:
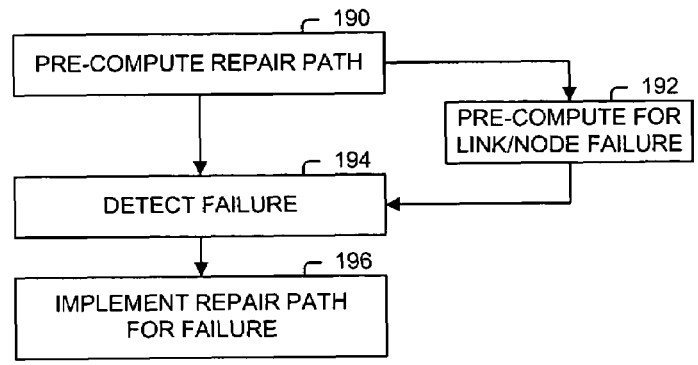
FIG. 8 is a flow diagram illustrating implementation of a backup route in one embodiment.

It will be seen that actual implementation of the backup path process is simple and will be apparent to the skilled person. FIG. 8 is a flow diagram illustrating implementation of the process. In brief summary, in process block 190, each node pre-computes repair paths based on the considerations set out above. This is carried out each time a new LSP is received from some node in the network. In some instances a succession of LSPs may be issued and so in an optimization a node operates a "hold-down" whereby it only pre-computes repair paths once a pre-determined time—say several seconds has elapsed since receipt of the last LSP, or the LSPs have been received successively for a long period, say a minute. This is acceptable as the repair path will only be used in the event of a subsequent failure. As an alternative, if a node recognizes that it is issuing one in a series of LSPs a tag can be added to the LSP using any appropriate protocol to indicate that the LSP is one of a series. On receiving such an LSP, the receiving node can defer re-computing repair paths until the series finishes, once again reducing the computational burden.

In an optimization, in optional process block 192, repair paths are pre-calculated for presumed node failures as well as, if it can be identified that the failed node would be a single point of failure for any neighbor node, and no neighbor nodes would be unreachable for other reasons, link failure repair paths to the "failed node" as discussed above for those nodes. If it is established that certain unreachable nodes are unavailable other than because the failed node is a single point of failure then a non-repair path strategy is adopted for the node rather than a partial repair strategy as discussed above.

In process block 194, when a component fails, an adjacent node (the repairing node) detects this. The manner in which failure is detected will be well known to the skilled person and will be dependent upon the specific nature of the source node and the adjacent component. In process block 196, as soon as failure is detected the pre-computed repair path is adopted for traffic which would otherwise traverse the adjacent component. Dependent upon the final destination of incoming traffic, the appropriate repair path is then selected for that traffic. The process can equally be applied in case of planned downtime of a component in which case appropriate notification to the node ensures no packet loss, or where appropriate protocols are in place, in cases where traffic is redirected to other paths because of adjacent component overload.

The mechanism by which the repair paths are stored and implemented will be well known to the skilled person such that a detailed description is not required here. Repair paths are calculated in the existing routing code as a natural extension of the computation as carried out in any event. Various databases and tables storing the routing and forwarding information can be updated in any appropriate manner, for example varying appropriate data fields or pointers in database entries or by storing repair paths along with normal entries. The above discussion assumes that each node is capable of acting as a tunnel termination point and performing directed forwarding or an equivalent mechanism which may not be the case for all routers. To the extent that a node is available to carry out the appropriate functions this can be advertised by modifying the appropriate fields in the advertisement and where this is not present, it can be inferred that the router sending an advertisement does not support tunnel termination. This can be a further factor in selecting a desired intermediate node.

Although the computation of the repair path is discussed as taking place at the repair node it can equally occur at a remote node which then downloads repair paths to all repairing nodes. Although tunneling and directed forwarding are discussed as technique for forwarding packets to the intermediate node, any appropriate packet routing mechanism can be adopted as long as it is supported by the relevant nodes, for example loose or strict source routing. The process steps set out can be carried out in any appropriate order, for example P-space and Q-space can be constructed in any order or indeed simultaneously and aspects from the examples and embodiments described juxtaposed or interchanged as appropriate.

After a failure has been detected, packets are typically transmitted over corresponding backup routes, and the change in the network configuration is advertised to the other nodes via one or more routing protocols. Similarly, the "failed" or taken out of service one or more nodes and/or links are typically subsequently brought back into service, and the change in the network configuration is advertised to the other nodes via one or more routing protocols.

However, whenever a link cost is changed or a link or node is removed or replaced in the topology of the network, the resulting temporary inconsistencies in the link state database can give rise to forwarding loops. As previously discussed, link state routing algorithms allow routers to generate a set of loop-free routes by independently executing a Shortest Path First (SPF) algorithm on a link state database (LSDB) containing a description of the entire network topology. The distribution process of the routing algorithm ensures that the databases held by each router are consistent when the network topology is stable. However, during periods of topology change, such as will be introduced when the information about the failure is propagated, the databases will become inconsistent, and thus the routes generated from them may produce loops, which persist until the databases are once more consistent. This "re-convergence" may take a relatively long time (e.g., several hundred milliseconds in one application), and thus may cause disruption for periods an order of magnitude greater than that originally caused by the failure. In particular, it is likely that the traffic flowing towards the failure, which would be carried by the repair paths if it reached them, will be subject to looping and will be dropped before it enters the repair paths. The repair paths will therefore become redundant as soon as the failure is announced.

However, by advertising the link cost changes in sufficiently small increments, it is possible maintain the loop free property of the routing methodology during the period of incremental changes.

One mechanism for avoiding routing loops is described in Ian Michael Charles Shand, "Method and Apparatus for Advertising a Link Cost in a Data Communications Network," U.S. patent application Ser. No. 10/323,358, filed Dec. 17, 2002, which is hereby incorporated by reference. As discussed therein, it is possible to avoid at least some routing loops by successively advertising an incremented or decremented cost value associated with a link over a period of time, rather than changing the cost value in a single step to its objective value.

The use of the incremental technique for maintaining the loop free property considerably extends the time taken for the network to re-converge. During this period, unlike during the convergence period in a conventional network, packets typically will not be dropped or subject to looping. Although the following may discuss "incrementing" costs, these teachings also apply to decrementing costs as one skilled in the art would readily comprehend.

The duration of the convergence time of the LSDB in the different nodes of the network is proportional to the number of increments which need to be issued. Where it is possible to exercise some control over the choice of metrics within a routing domain it may be possible to optimize them to minimize the number of increments which will be required. This depends typically on (a) the size of the increments (i), which in turn is typically determined by the minimum link cost within the network, and (b) the range of costs (r) between the original cost of a failed link, and the maximum value required before the final increment to "infinity" (e.g., after the cost has surpassed a threshold, any additional increment will have no further affect) increment has passed, which is affected by the total cost of the minimum cost alternative path.

In one embodiment, the number of increments is then r/i. So, at a first level of approximation the maximum number of increments required is proportional to the ratio between the lowest link cost and the highest. The lowest link cost determines i, while the highest link cost places an upper bound on r. The worst r can be is some multiple of the maximum link cost, but in practice it is likely to be dominated by a single link of high cost.

Consequently a choice of one for the minimum cost and (say) twenty for the maximum cost is likely to require of the order of twenty increments. Similarly a choice of one hundred for the minimum and two thousand for the maximum will also require of the order of twenty increments, but the latter choice allows for one thousand nine hundred different metric values, while the former only allows nineteen. Under some circumstances this may be an advantage.

A network in which links (nodes) which require protection have an alternative path which is only a few multiples of the lowest link cost (i.e., increments) greater than the cost of the protected link will require only a few increments, and thus re-convergence time will be minimized.

In some cases the combination of link costs and topology will result in a very large number of increments being required to complete a loop free re-convergence. Since this would result in an unacceptable duration for the repair period, it is preferable to set an upper bound (specified by a management parameter) on the number of increments which will be used. If during repair path computation for a particular link it becomes apparent that it would be necessary to exceed this threshold, protection is not operated for the link, in the same way as if no link repair had been possible.

Figure 9A:
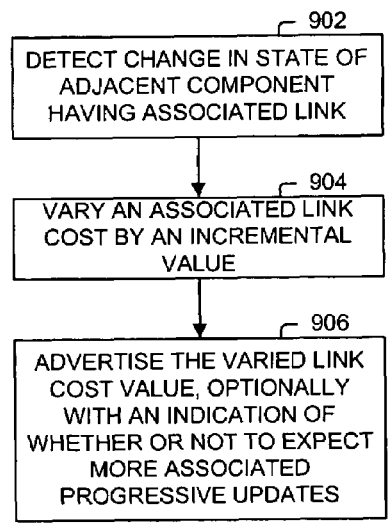
FIG. 9A is a flow diagram illustrating a process used in one embodiment for determining and advertising progressive routing updates.

FIG. 9A is a flow diagram illustrating a high-level view of a process used in one embodiment to advertising link cost on a data communication network. In process block 902, a change in the state of an adjacent component having an associated link is detected. Changes in state may include, but are not limited to failures of a network component, deactivation of a network component due to planned downtime, activation of a network component, etc. In process block 904, a link cost value for a link associated with the component that underwent a change in state is varied by an incremental value. Varying the link cost value may include incrementing (increasing) the link cost value, decrementing (decreasing) the link cost value, modifying the link cost value by a multiplier or other factor, etc. In process block 906, the varied link cost value is advertised to other nodes in the network, optionally with an indication of whether or not to expect to receive more associated progressive updates in the future.

Figure 9B:
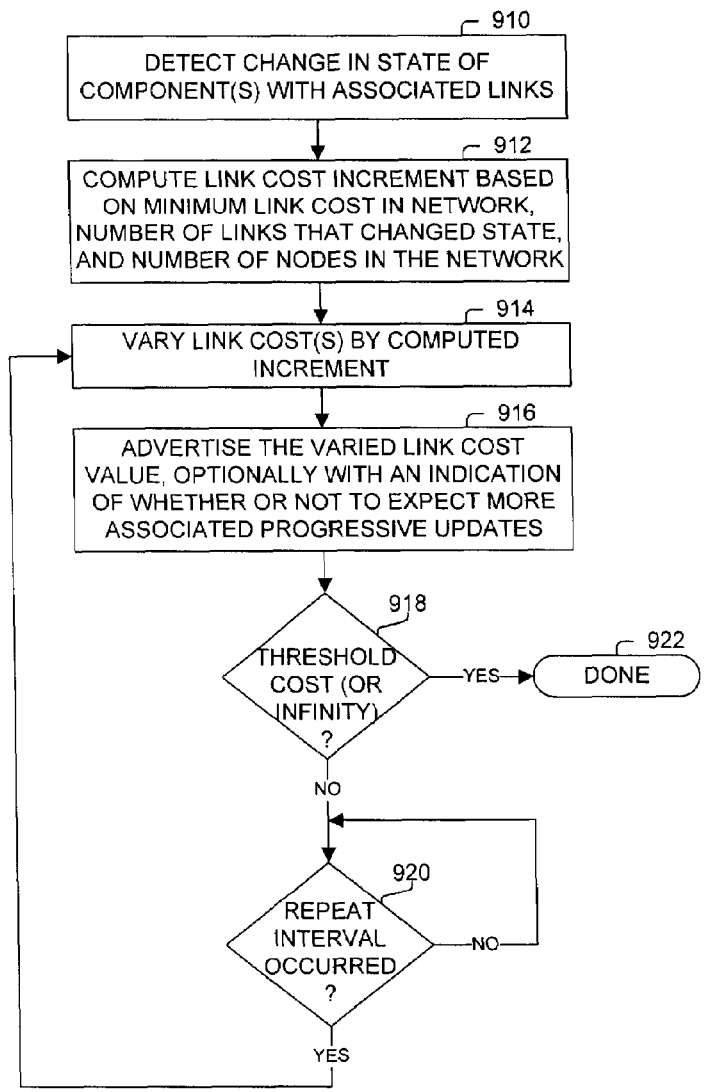
FIG. 9B is a flow diagram illustrating a process used in one embodiment for determining and advertising progressive routing updates.

FIG. 9B is a flow diagram illustrating a process used in one embodiment for advertising a link cost on a data network. In process block 910, a change is detected in the state of one or more components having associated links. As in FIG. 9A, block 902, changes in state may include failure of a component, deactivation of a component due to planned downtime, activation of a component, etc.

In process block 912, a link cost increment is computed, based on the minimum link cost in the network, the number of links for which a state change was detected in process block 910, and the number of nodes in the network. In one embodiment, the link cost increment is computed such that for a change of state of m links and n nodes an incremental value i meets a condition (m+2n) i<2L, where L is a minimum link cost on the network.

In process block 914, the link costs are varied for links associated with components for which a state change was detected in process block 902. Varying the link cost value may include incrementing (increasing) the link cost value, decrementing (decreasing) the link cost value, modifying the link cost value by a multiplier or other factor, etc. Most commonly, when the detected state change for a component indicates deactivation or failure, the associated link cost is incremented by the computed link cost increment value, and when a detected state change indicates re-activation, the link cost is decremented by the link cost increment value.

In process block 916, the link cost value is advertised to other nodes in the network, optionally with an indication of whether or not to expect to receive more associated progressive updates in the future. In process block 918, a test is performed to determine whether the varied link cost value has reached either a threshold cost value or a value approximating infinity. If the test of block 918 is true, then there is no further need to increment and advertise link cost values, and processing completes at block 922.

Otherwise, in process block 920, a test is performed to determine whether a specified repeat interval time has elapsed. If so, then control passes to block 914, in which the link costs are varied again by the previously computed increment, and then the new varied link cost value is advertised again in process block 916.

In one embodiment, an increment can be generated as soon as it can be guaranteed that no node will receive the increment before any of its neighbors have received and processed the previous increment (i.e., after a delay representing the sum of the maximum expected propagation delay between any pair of adjacent nodes and the maximum expected difference in delay between receiving an LSP and the result of the SPF computation based on that LSP being used for forwarding traffic). This delay will be measurable or known based on the specific network components and configuration in use and can, for example, be configured as a management parameter.

Any increments in a failed link cost will only affect links lying on a common path with the failed link. Thus, rather than identifying the smallest link cost on the network, in one embodiment, only the smallest link cost in the reverse spanning tree rooted at the far end of the failed link, and which traverses the failed link, is considered. The "reverse spanning tree", sometimes termed a "sink tree," shows the optimum route for each node from which the node is reachable.

Figure 9C:
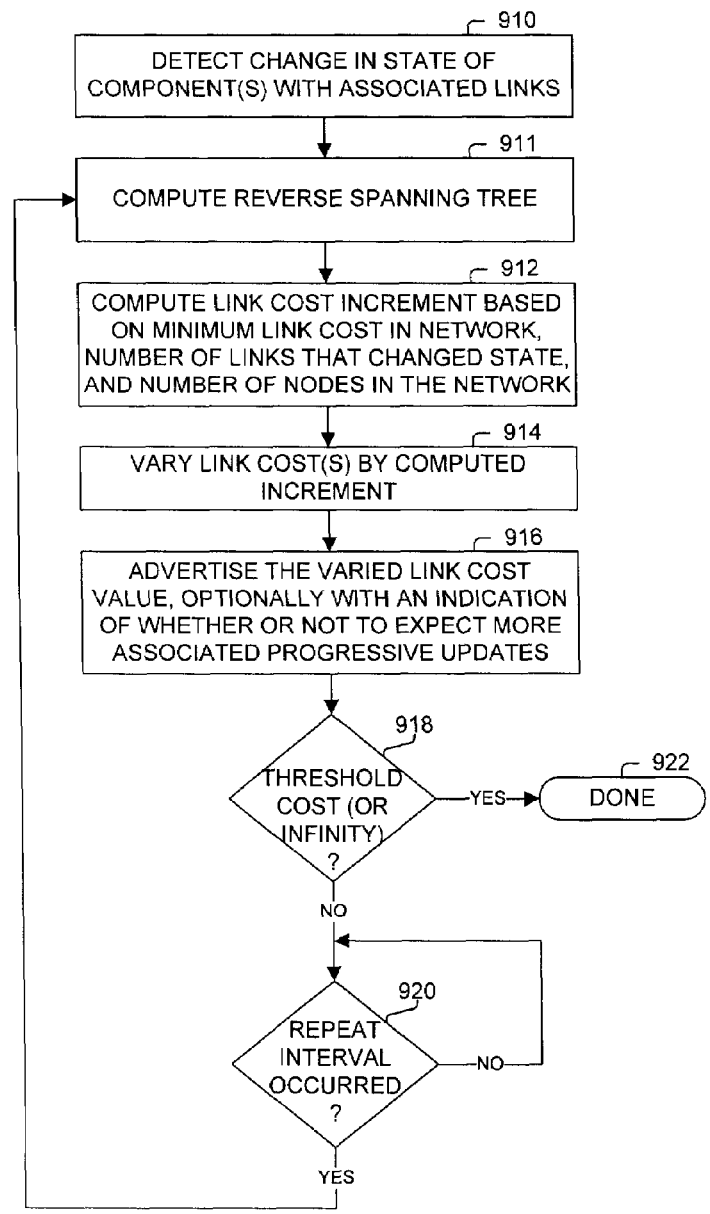
FIG. 9C is a flow diagram illustrating a process used in one embodiment for determining and advertising progressive routing updates.

In this regards, FIG. 9C illustrates a process used in one embodiment, which is similar to the flow diagram of FIG. 9B and thus the discussion of these common process blocks will not be repeated. FIG. 9C specifically presents process block 911, the operation of computing the reverse spanning tree. In one embodiment, the reverse spanning tree is computed between the steps illustrated in process blocks 910 and 912. Moreover, in one embodiment, the reverse spanning tree is computed each interval and thus, the maximum permissible next increment is computed after each increment as indicated by processing flowing from process block 920 to process block 911. This may result in the previous lowest cost link being excluded as a result of which the maximum increment can be increased. Also, for successive recalculation, it is likely that the reverse spanning tree will shrink as fewer and fewer lowest cost routes include the increasing cost of the failed link. However, in one embodiment, the reverse spanning tree is computed only once, and thus processing proceeds from process block 920 to process block 914 (in the manner illustrated in FIG. 9B). Accordingly, control may transfer to block 924 from block 920, as shown in FIG. 9B, rather than directly from block 920 to block 914.

In one embodiment, when repair paths are being calculated for a failed component, incrementing of the cost is synchronized between neighboring nodes of the failed node such that the nodes await incremented LSPs from each other neighbor node for which a repair path is available before issuing a further increment.

Referring again to the test of block 918 (FIGS. 9B and 9C), it will be recognized that as a further optimization it is not necessary to continue to increment the link cost to infinity especially as the true value which represents infinity can be very high. In fact, it is only necessary to increment the cost until a threshold cost at which the cost of the link is such that no nodes in the network will compute a route using it. In the case of link failure, this is guaranteed to have occurred when the cost of the AB link has been incrementally increased to the point where it is greater than the minimum cost path from A to B not passing over the link AB. At that point the cost of a failed link can be increased to "infinity" in one final jump. In the case of failure of a node B the link cost is incremented until it is greater than, for all nodes X, the cost of AX via the shortest alternative path less the cost BX, where the values can be easily computed by running an SPF routed at A.

In order to minimize the convergence time, in one embodiment, the increment cost is optimized to minimize the number of advertised link cost changes within the increment value limits discussed above.

Although the above discussion relates to incremental increases in a link cost when a network component fails or is otherwise taken out of service, the approach can be applied equally in the case where a network component is introduced into service. In conventional systems this would effectively be achieved by advertising a link cost change to the new cost in a single jump down from "infinity" which once again can give rise to loops. In that case, according to the present method, the link cost is first advertised at the upper bound discussed above, i.e. the link cost of the minimum cost path not traversing the new component. This cost is then incrementally decreased, using the same increments and time intervals as for incrementally increasing costs until it reaches the configured value for the link cost. However the node advertising the costs can treat the link throughout as having its final configured cost which can cause data traffic to pass through the link sooner than would otherwise be the case.

This advertising of progressive values of network metrics (e.g., link costs/distances) is applicable to transitioning to a backup route, transitioning from a backup route, and transitioning in response to other network topology and/or configuration changes. When a node receives a routing update, it typically updates one or more data structures (e.g., LSDB) with the new value(s), calculates new routes (e.g., determines the new SPF), updates one or more instances of the routing information base (RIB) and the forwarding information base (FIB). Using the technique of varying costs, rather than an immediate step change in value, causes this processing and updating to be performed many multiples of times (e.g., twenty times in the previous example).

In order to avoid this induced extra processing and route updating on each of the nodes, a node advertising an incremental route update may send out a link state packet (LSP) indicating the change in the metric (e.g., cost, distance, etc.), as well as an indication that the receiving node may expect to receive one or more subsequent updates associated with the incremental changes. The receiving node performs its SPF or other routing calculation to identify the resultant routing table. However, as the node expects a new value (e.g., that corresponding to the next incremental increase in the routing metric), the node identifies whether the change is sufficiently important to warrant updating its routing tables (e.g., RIB, FIB). One embodiment only updates these routing tables if the next hop information (e.g., destination address of the next hop, outgoing interface to reach the next hop) has changed. Otherwise, the routing tables are not updated (e.g., BGP is not notified of the resulting changes, nor are the linecards updated with the new FIB information). Additionally, a time-out or other fault detection mechanism is typically employed by a receiving node to update the routing tables should an expected routing update packet not be received within an appropriate timeframe.

One embodiment maintains one or more sets of routing information. A network topology change indication of a progressive series of network changes is received, with at least one more associated network topology change indication of the progressive series of network changes expected to be received in the future. An updated set of routing information is computed based on the network topology change indication, and a determination is made as to whether or not the updated set of routing information reflects a change in nexthop information for one or more routes. In response to determining that the new set of routing information does not change nexthop information for said one or more routes and given the expectation of at least one more associated network topology change indication of the progressive series of network changes is expected to be received in the future, the routing information is not updated based on the updated set of routing information. However, if the nexthop information changes or another associated network topology change indication of the progressive series of network changes is not expected to be received in the future, then the routing information is typically updated. Such progressive series of network changes may correspond to transitioning to a backup route, transitioning from a backup route, or transitioning in response to other network topology and/or configuration changes.

Figure 10A:
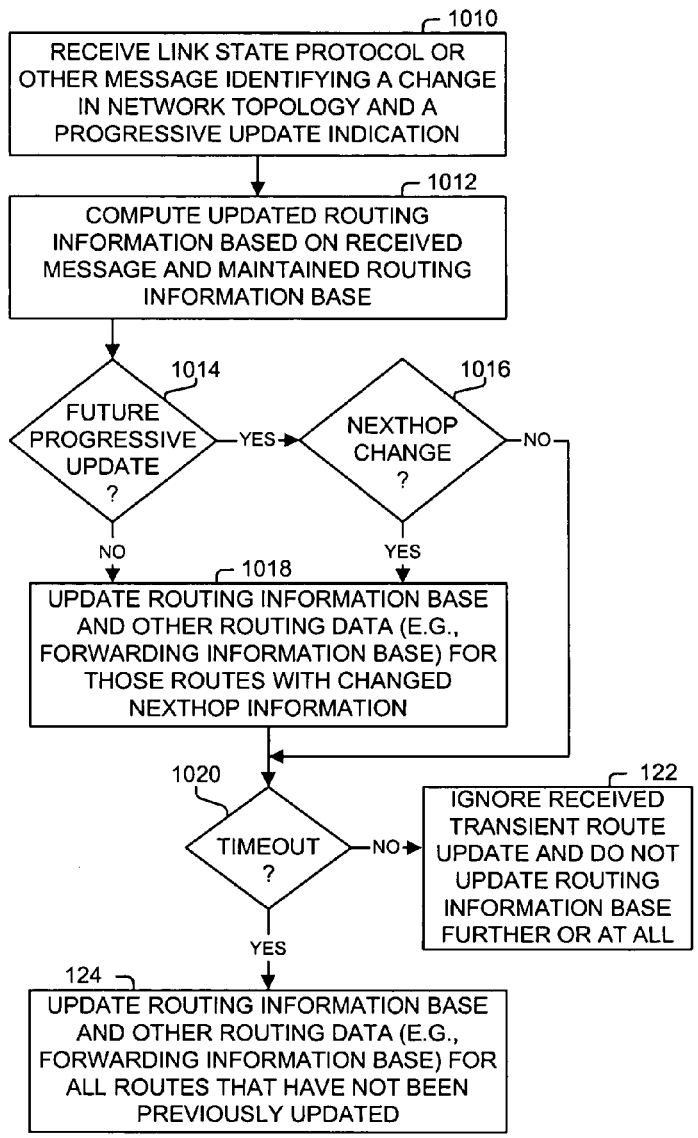
FIG. 10A is a flow diagram illustrating a process used in one embodiment for identify whether or not to update a routing information base in response to a received routing update.

FIG. 10A illustrates a process used in one embodiment for identify whether or not to update a routing information base in response to a received routing update. In process block 1010, a link state protocol or other routing update message is received which indicates a change in network topology and a progressive update indication (i.e., whether or not to expect to receive more associated progressive updates in the future).

Figure 10B:
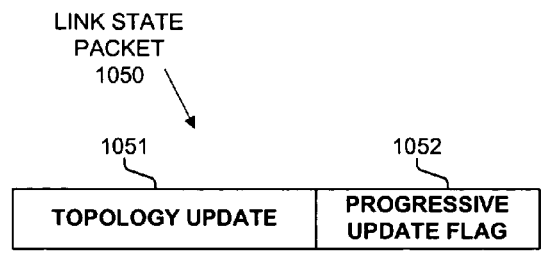
FIG. 10B is a block diagram illustrating fields of a route update message including a route update and an indication of whether or not to expect to receive associated progressive updates in the future.

Turning briefly to FIG. 10B, illustrated are fields of an exemplary topology update message 1050 (e.g., a link state packet or LSP), which includes one or more topology updates 1051 and an indication 1052 of whether or not to expect to receive associated progressive updates in the future corresponding to the one or more topology updates 1051. In one embodiment, a route update message may include more than one set of fields 1051 and 1052.

Returning to FIG. 10A, next in process block 1012, the updated routing information is computed based on the received route update(s) and the maintained routing information base (i.e., a SPF computation or other routing update determination is performed). As determined in process blocks 1014 and 1016, if there is either no future progressive update expected or a nexthop value (e.g., nexthop address, outgoing interface) has changed for a particular route, then in process block 1018, the routing information base is updated based on the computed updated routing information typically only for those routes with changed nexthop information. Note, in determining whether or not the nexthop information has changed for a route, one embodiment does not check each and every route.

Process block 1020 serves as a timeout safeguard to ensure that a next associated progressive update is actually received in the future within an appropriate timeframe. Although not used in all embodiments, this timeout safeguard can be important because the process illustrate in FIG. 10A filters out some important topology update information, which is identified as being transient in nature. Thus, this brief disturbance in the network topology information used for determining routes is all right, as long as it is actually transient in nature and short in duration. Thus, as determined in process block 1020, if updated information corresponding to a piece of received topology information marked transient in nature is not received within an appropriate timeframe, a timeout is generated and the routing information base is updated based on this received topology information, even though it was marked as being transient in nature. Otherwise, as indicated by 122, this received topology information is ignored as more current information has been received.

Figure 11:
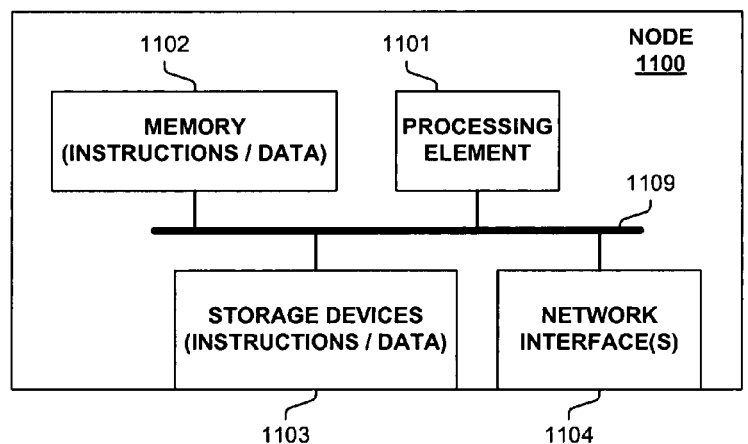
FIG. 11 is a block diagram of a node or component thereof, for running one or more processes, such as, but not limited to for identifying backup routes, distributing progressive metrics, identifying and suppressing transient routing updates and/or other processes used in one embodiment.

FIG. 11 is a block diagram of a system or component 1100 thereof, for running one or more processes, such as, but not limited to for identifying backup routes, distributing progressive metrics, identifying and suppressing transient routing updates and/or other processes used in one embodiment. In one embodiment, system or component 1100 performs one or more processes corresponding to one of the flow diagrams illustrated or otherwise described herein.

In one embodiment, component 1100 includes a processing element 1101, memory 1102, storage devices 1103, and an interface 1104 for sending and receiving packets, items, and/or other information, which are typically coupled via one or more communications mechanisms 1109 (shown as a bus for illustrative purposes.) Various embodiments of component 1100 may include more or less elements. The operation of component 1100 is typically controlled by processing element 1101 using memory 1102 and storage devices 1103 to perform one or more tasks or processes. Memory 1102 is one type of computer-readable media, and typically comprises random access memory (RAM), read only memory (ROM), flash memory, integrated circuits, and/or other memory components. Memory 1102 typically stores computer-executable instructions to be executed by processing element 1101 and/or data which is manipulated by processing element 1101 for implementing functionality in accordance with an embodiment. Storage devices 1011 are another type of computer-readable media, and typically comprise solid state storage media, disk drives, diskettes, networked services, tape drives, and other storage devices. Storage devices 1103 typically store computer-executable instructions to be executed by processing element 1101 and/or data which is manipulated by processing element 1101 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus comprising one or more processing elements and memory, wherein the memory stores one or more instructions that, when executed by said one or more processing elements, performs operations comprising: maintaining one or more sets of routing information; wherein said maintaining one or more sets of routing information includes:
   computing an updated set of routing information based on a received network topology change indication and said one or more sets of routing information, the updated set of routing information including changes in one or more routes in said one or more sets of routing information, the network topology change indication being one of a progressive series of network changes related to a specific detected change in the network with at least one more associated network topology change indication of the progressive series of network changes expected to be received in the future; wherein the network change indication includes a value identifying that said at least one more associated network topology change indication of the progressive series of network changes is expected to be received in the future; and
   in response to determining that said updated routing information does not change nexthop information of said maintained one or more sets of routing information and said expectation, defined by the value, of said at least one more associated network topology change indication of the progressive series of network changes to be received in the future, determining not to update said one or more sets of routing information based on the updated set of routing information.

2. The apparatus of claim 1, wherein said maintaining one or more sets of routing information includes: computing a second updated set of routing information based on a second received network topology change indication and said one or more sets of routing information, the second updated set of routing information including changes in one or more routes in said one or more sets of routing information, the second network topology change indication being one of the progressive series of network changes with at least one more associated network topology change indication of the progressive series of network changes expected to be received in the future; and in response to determining that second updated set of routing information does change nexthop information of said maintained one or more sets of routing information, updating said one or more sets of routing information based on the second updated set of routing information.

3. The apparatus of claim 1, wherein the network topology change indication identifies one or more routing metric changes.

4. The apparatus of claim 1, wherein said maintaining one or more sets of routing information includes: in response to identifying a timeout condition corresponding to the updated set of routing information subsequent to said determination of not to update said one or more sets of routing information based on the updated set of routing information, updating said one or more sets of routing information based on the updated set of routing information.

5. A method for updating routing information, the method comprising: maintaining a routing information base; wherein said maintaining one or more sets of routing information includes:
   receiving a network topology change indication, the network topology change indication including a route update of a progressive series of route updates for switching routing to a computed backup path; wherein the network topology change indication includes a value defining to expect one or more route updates of the progressive series of route updates;
   performing a shortest path first determination based on the route update and the routing information base to identify an updated set of routing information, including updated one or more routes; and
   in response to determining that the updated set of routing information does not change nexthop information for one or more routes included in the routing information base and the value to expect one or more route updates of the progressive series of route updates, determining not to update said one or more sets of routing information based on the updated set of routing information even though it includes said updated one or more routes.

6. The method of claim 5, wherein said maintaining one or more sets of routing information includes: subsequent to said determination not to update said one or more sets of routing information, in response to identifying a timeout condition corresponding to the updated set of routing information, updating said one or more sets of routing information based on the updated set of routing information.

7. An apparatus for updating routing information, said apparatus comprising: means for maintaining one or more sets of routing information; wherein said means for maintaining one or more sets of routing information includes:
   means for receiving a network topology change indication, the network topology change indication being one of a progressive series of network changes related to a specific detected change in the network with at least one more associated network topology change indication of the progressive series of network changes expected to be received in the future; wherein the network change indication includes a value identifying that said at least one more associated network topology change indication of the progressive series of network changes is expected to be received in the future;
   means for computing an updated set of routing information based on the network topology change indication and said one or more sets of routing information, the updated set of routing information including updated one or more routes;

means for determining not to update said one or more sets of routing information based on the updated set of routing information, even though it includes said updated one or more routes, in response to determining that said updated set of routing information does not change nexthop information in said maintained one or more sets of routing information and said expectation, defined by the value, of said at least one more associated network topology change indication of the progressive series of network changes to be received in the future.

8. The apparatus of claim 7, wherein said means for maintaining one or more sets of routing information includes: means for updating said one or more sets of routing information based on the updated set of routing information in response to determining that the new set of routing information does change nexthop information in said maintained one or more sets of routing information.

9. The apparatus of claim 7, wherein the network topology change indication identifies one or more routing metric changes.

10. The apparatus of claim 7, wherein said means for maintaining one or more sets of routing information includes: means for, subsequent to said determining not to update said one or more sets of routing information, updating said one or more sets of routing information based on the updated set of routing information in response to identifying a timeout condition corresponding to the updated set of routing information.

11. An apparatus for updating routing information, the apparatus comprising: means for maintaining a routing information base; wherein said means for maintaining a routing information base includes:

means for receiving a network topology change indication, the network topology change indication including a route update of a progressive series of route updates for switching routing to a computed backup path; wherein the network topology change indication includes a value defining to expect one or more route updates of the progressive series of route updates;

means for performing a shortest path first determination based on the route update and the routing information base to identify an updated set of routing information, including updated one or more routes;

means for determining not to update said one or more sets of routing information based on the updated set of routing information even though it includes said one or more updated routes in response to determining that the updated set of routing information does not change nexthop information for one or more routes included in the routing information base and the value to expect one or more route updates of the progressive series of route updates.

12. The apparatus of claim 11, wherein said means for maintaining a routing information base includes: means for updating said one or more sets of routing information based on the updated set of routing information subsequent to said determination not to previously update the routing information base in response to identifying a timeout condition corresponding to the updated set of routing information.

13. A method, comprising: maintaining one or more sets of routing information in a router, for use by the router in routing of packets; wherein said maintaining one or more sets of routing information includes:

computing an updated set of routing information based on a received network topology change indication and said one or more sets of routing information, the updated set of routing information including changes in one or more routes in said one or more sets of routing information, the network topology change indication being one of a progressive series of network changes related to a specific detected change in the network with at least one more associated network topology change indication of the progressive series of network changes expected to be received in the future; wherein the network change indication includes a value identifying that said at least one more associated network topology change indication of the progressive series of network changes is expected to be received in the future; and in response to determining that said updated routing information does not change nexthop information of said maintained one or more sets of routing information and said expectation, defined by the value, of said at least one more associated network topology change indication of the progressive series of network changes to be received in the future, determining not to update said one or more sets of routing information based on the updated set of routing information.

14. The method of claim 13, wherein said maintaining one or more sets of routing information includes: computing a second updated set of routing information based on a second received network topology change indication, the second updated set of routing information including changes in one or more routes, the second network topology change indication being one of the progressive series of network changes with at least one more associated network topology change indication of the progressive series of network changes expected to be received in the future; and in response to determining that second updated set of routing information does change nexthop information of said maintained one or more sets of routing information, updating said one or more sets of routing information based on the second updated set of routing information.

15. The method of claim 13, wherein the network topology change indication identifies one or more routing metric changes.

16. The method of claim 13, wherein said maintaining one or more sets of routing information includes: in response to identifying a timeout condition corresponding to the updated set of routing information subsequent to said determination of not to update said one or more sets of routing information based on the updated set of routing information, updating said one or more sets of routing information based on the updated set of routing information.

* * * * *